Dec. 1, 1925.
F. C. KEHR
CURVE OILER
Filed April 10, 1924
1,563,996
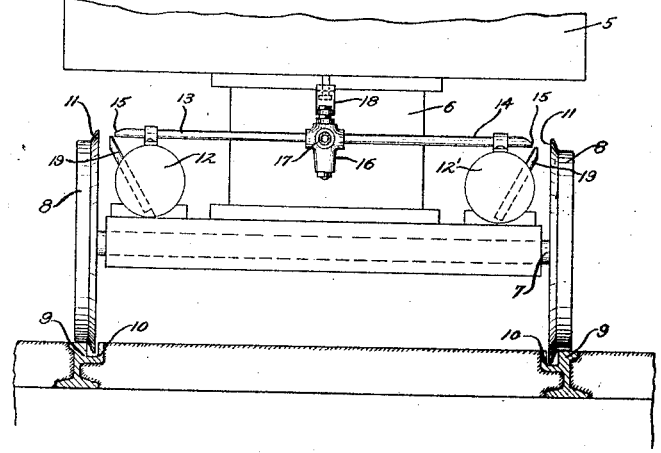
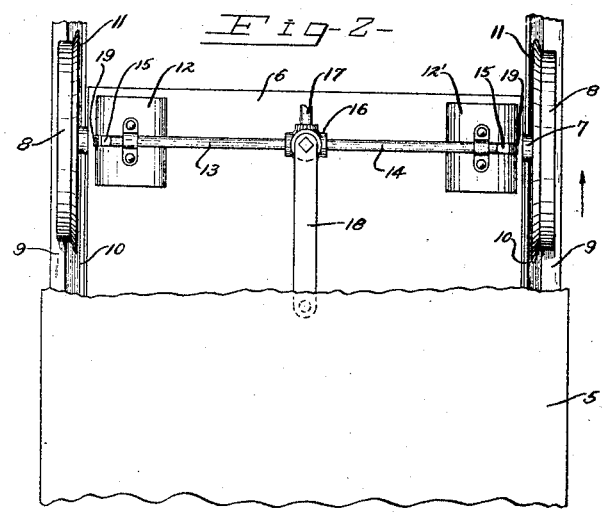
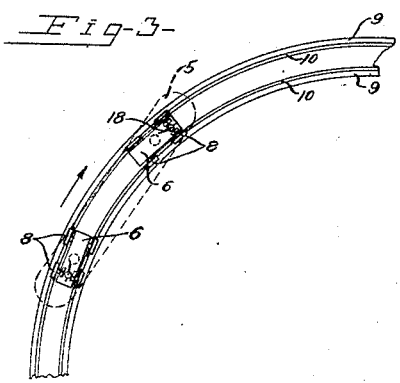
INVENTOR.
Frederick C. Kehr.
BY
Morsell, Keeney & Morsell
ATTORNEYS.

Patented Dec. 1, 1925.

1,563,996

UNITED STATES PATENT OFFICE.

FREDERICK C. KEHR, OF MILWAUKEE, WISCONSIN.

CURVE OILER.

Application filed April 10, 1924. Serial No. 705,610.

*To all whom it may concern:*

Be it known that I, FREDERICK C. KEHR, a citizen of the United States, and resident of Milwaukee, in the county of Milwaukee and State of Wisconsin, have invented new and useful Improvements in Curve Oilers, of which the following is a description, reference being had to the accompanying drawings, which are a part of this specification.

This invention relates to improvements in curve oilers, particularly adapted to automatically lubricate the flanged portions of the wheels of vehicles using tracks when said vehicles reach a curved portion of a track, and also to lubricate the portion of the track against which said flanged portions of the wheels bear in describing a curve.

Tracks for street cars, trains, and the like are so constructed that at the curves, inner guide rails or portions are formed to prevent the vehicle wheels from slipping from the tracks when the vehicle rounds a curve. Obviously, the flanged portions of the vehicle wheels always bear against said guide rails, causing friction and wear, with the result that the curved track portions must always be kept well lubricated. Heretofore, it has been found necessary to manually lubricate the curved portions of vehicle tracks, this being a slow and tedious operation and requiring traction companies to specially employ workers for that particular purpose.

It is, therefore, the principal object of the present invention to eliminate the above objections and difficulties by providing a device to automatically lubricate the curved portions of tracks where and when such lubrication is needed.

A further object of the invention is to provide an attachment for tracked vehicles which will automatically oil the wheel flanges the moment the vehicle reaches a curve in the track, the oiling continuing throughout the entire curve.

A further object of the invention is to provide a device of the class described which utilizes compressed air which is stored in a tank attached to the vehicle for the operation of the vehicle air brakes.

A further object of the invention is to provide an attachment for street cars and the like with which a vehicle may be easily equipped without any material alteration thereof.

A further object of the invention is to provide an attachment of the class described which is of very simple construction, is strong and durable, is economical in use, and is well adapted for the purpose described.

With the above and other objects in view, the invention consists of the improved automatic curve oiling attachment and its parts and combinations as set forth in the claims, and all equivalents thereof.

In the accompanying drawing in which the same reference characters indicate the same parts in all of the views:

Fig. 1 is a fragmentary front view of a street car showing the wheels thereof mounted on tracks and equipped with the automatic oiling device;

Fig. 2 is a fragmentary plan view thereof; and

Fig. 3 is a view of a curved portion of a track showing the street car trucks thereon, the position of the street car body and its relation to the position of the trucks being shown in dotted lines.

Referring now more particularly to the drawing it will be seen that the numeral 5 represents the portion of the body of a street car or other tracked vehicle to which is pivotally secured a truck member 6 carrying an axle 7 on the opposite ends of which are mounted a pair of wheels 8. Said wheels ride on and are guided by car tracks 9 of ordinary construction.

The invention particularly relates to curved parts of the tracks 9, it being customary to provide such portions of tracks with inner guide rails 10 to prevent the car wheels from slipping from the tracks in rounding a curve. Obviously, the inner faces of the wheels are thrust against said guide rails by the curvature of the track and the flanged portions 11 of the car wheels bear and scrape against the same, thereby requiring the lubrication of the guard rails or wheel flanges. To that end, therefore, the forward end of each truck 6 carries a pair of tanks 12 and 12', one of which is positioned adjacent the inner face of each of the wheels 8, as shown. A pair of air pipes 13 and 14, having their nozzle portions 15 supported above the tanks, extend transversely inwardly and are joined by a centrally located coupling member 16, said member 16 also receiving an air pipe 17 which communicates with a compressed air tank (not shown) carried by the car. The aforementioned tank is of the usual form of tank carried by cars to store the air used by the air brakes.

Located within the coupling member is a three way valve of ordinary construction to control the openings to the pipes 13, 14, and 17 and said three way valve is operated by means of a lever 18 which is connected to the valve and to the underside of the car body, as shown.

In Fig. 3 the relation of the position of the body of the car to the car trucks is shown, when the car rounds a curve in the tracks and it will be noted that trucks turn with respect to the body. If the car is going in the direction of the arrow in Fig. 3 the body of the car will cause the lever 18 to turn to the left thereby operating the three way valve to open the communication to the pipe 17 and the pipe 14, but shutting off the opening to the pipe 13. This will cause air to rush from the air storage tank through the pipes 17 and 14, the same being discharged from the nozzle portion 15 over the open end portion of a pipe or tube 19 which is inserted in the oil tank 12'. Oil will be draw thereby from the tank and sprayed against the outer surface of the wheel flange 11 which will in turn deposit oil on the guard rail 10 to lubricate the same. If the car is going in a direction opposite from that described, obviously, the operation will be the reverse and the lever 18 will be turned to the right to open the valves of pipes 17 and 13 and oil will be sprayed against the opposite wheel. When the car is going in a straight course, the lever 18 will remain parallel with the car body and the three way valve will be held in a neutral position so that the openings to all of the pipes will be closed and the device will not function.

It is evident that both the front and rear trucks of a car may be equipped with the improved device so that the fore truck wheels will be oiled no matter in which direction the car is going. Also the device is applicable to all street, elevated, subway and interurban cars, and all vehicles employing tracks.

From the foregoing description it will be seen that the improved automatic curve oiling device is of very simple and novel construction, and is well adapted for the purpose set forth.

What I claim as my invention is:

1. The combination with a tracked vehicle equipped with a pivotal truck member carrying a wheel at each side thereof, of a wheel oiling device, comprising an oil reservoir adjacent the inner face of each wheel, and means for automatically spraying oil from the left reservoir against the inner face of the left wheel when the truck member is turned to the left and from the right reservoir against the inner face of the right wheel when the truck member is turned to the right.

2. The combination with a tracked vehicle equipped with a pivotal truck member carrying a wheel at each side thereof, of a wheel oiling device, comprising an oil reservoir adjacent the inner face of each wheel, and means for automatically spraying oil from the left reservoir against the inner face of the left wheel when the truck member is turned to the left and from the right reservoir against the inner face of the right wheel when the truck member is turned to the right, the oiling device being inoperative when the truck member is in alinement with the vehicle body.

3. The combination with a tracked vehicle equipped with a compressed air tank and a pivotal truck member carrying a wheel at each side thereof, of a wheel oiling device, comprising an oil reservoir adjacent the inner face of each wheel, pipes leading from each reservoir and in connection with said compressed air tank to conduct air to spray oil from the reservoirs against the inner faces of said wheels, means for controlling the admission of air to said pipes, and means for automatically operating said controlling means when said truck members are turned with respect to the vehicle body.

4. The combination with a tracked vehicle equipped with a compressed air tank and a pivotal truck member carrying a wheel at each side thereof, of a wheel oiling device, comprising an oil reservoir adjacent the inner face of the left wheel, an oil reservoir adjacent the inner face of the right wheel, a pipe between the left reservoir and the air tank, a pipe between the right reservoir and the air tank, valves for said pipes, and means for automatically opening the valve of the left reservoir pipe when the truck member is turned to the left and opening the valve of the right reservoir pipe when the truck member is turned to the right.

5. The combination with a tracked vehicle equipped with a compressed air tank and a pivotal truck member carrying a flanged wheel at each side thereof, of a wheel oiling device, comprising an oil reservoir adjacent the inner face of the left wheel, an oil reservoir adjacent the inner face of the right wheel, a pipe between the left reservoir and the air tank, a pipe between the right reservoir and the air tank, valve means for said pipes, and a lever member connected to said valve means and to the vehicle body to operate said valve means when the truck member is turned with respect to the vehicle body by a curve in the vehicle tracks, the valve means controlling passage to the left reservoir pipe being automatically opened when the truck member is turned to the left and the valve means controlling passage to the right reservoir pipe being automatically opened when the truck member is turned to the right.

6. The combination with a tracked vehicle equipped with a pivotal truck member carrying a wheel at each side thereof, of a device for oiling the inside track rail of curves, comprising an oil reservoir adjacent each wheel and means for automatically spraying oil from the left reservoir when the truck member is turned to the left and from the right reservoir when the truck member is turned to the right.

7. The combination with a tracked vehicle equipped with a pivotal truck member carrying a wheel at each side thereof, of a wheel oiling device, comprising an oil reservoir adjacent each wheel, means for automatically spraying out from the reservoir adjacent the wheel on the inside track rail of a curve and onto said wheel, and a three-way valve member for controlling said spraying means.

In testimony whereof, I affix my signature.

FREDERICK C. KEHR.